(12) United States Patent
Beckett (10) Patent No.: US 9,295,910 B2
(45) Date of Patent: Mar. 29, 2016

(54) METHODS, APPARATUS AND SYSTEMS FOR USE OF A NON-NATIVE CHIPSET TO PLAY ORIGINAL VIDEO GAME CARTRIDGES

(71) Applicant: Wayne Hughes Beckett, Hong Kong (HK)

(72) Inventor: Wayne Hughes Beckett, Hong Kong (HK)

(73) Assignee: Hyperkin Inc., South El Monte, CA (US)

( * ) Notice: Subject to any disclaimer, the term of this patent is extended or adjusted under 35 U.S.C. 154(b) by 0 days.

(21) Appl. No.: 14/484,108

(22) Filed: Sep. 11, 2014

(65) Prior Publication Data

US 2014/0378224 A1    Dec. 25, 2014

Related U.S. Application Data

(63) Continuation-in-part of application No. 13/950,663, filed on Jul. 25, 2013.

(60) Provisional application No. 61/808,851, filed on Apr. 5, 2013.

(51) Int. Cl.
*A63F 13/00* (2014.01)
*A63F 13/95* (2014.01)

(52) U.S. Cl.
CPC ............. *A63F 13/00* (2013.01); *A63F 13/95* (2014.09)

(58) Field of Classification Search
None
See application file for complete search history.

(56) References Cited

U.S. PATENT DOCUMENTS

| | | |
|---|---|---|
| RE28,507 E | 8/1975 | Rusch |
| 4,095,791 A | 6/1978 | Smith et al. |
| 4,149,027 A | 4/1979 | Asher et al. |
| 4,359,222 A | 11/1982 | Smith, III et al. |
| 4,386,773 A | 6/1983 | Bronstein |
| 4,596,390 A * | 6/1986 | Studley ........................... 463/47 |
| 4,687,200 A | 8/1987 | Shirai |
| 4,922,420 A * | 5/1990 | Nakagawa et al. ............. 463/29 |
| 5,112,051 A | 5/1992 | Darling et al. |
| 5,207,426 A | 5/1993 | Inoue et al. |
| 5,802,544 A * | 9/1998 | Combs et al. ...................... 711/5 |
| 5,941,775 A * | 8/1999 | Naka et al. ...................... 463/44 |
| 6,042,478 A * | 3/2000 | Ng .................................. 463/44 |
| 7,988,559 B2 | 8/2011 | Yoseloff et al. |
| D656,554 S | 3/2012 | Mar |
| 2005/0020337 A1 * | 1/2005 | Simmons ........................ 463/11 |

* cited by examiner

*Primary Examiner* — Jay Liddle
*Assistant Examiner* — Alex F. R. P. Rada, II
(74) *Attorney, Agent, or Firm* — Edward C. Schewe (57) ABSTRACT

Apparatus, methods and systems using a more powerful, but non-native, modern CPU/GPU chipset to play one or more types of original console games. The apparatus, methods and systems incorporate a modern processor and therefore corresponding modern components and have circuitry that can be used to access original games.

12 Claims, 5 Drawing Sheets

METHODS, APPARATUS AND SYSTEMS FOR USE OF A NON-NATIVE CHIPSET TO PLAY ORIGINAL VIDEO GAME CARTRIDGES

RELATED APPLICATION DATA

This application claims the benefit of U.S. patent application Ser. No. 13/950,663 titled Methods, Apparatus and Systems for Use of a Non-Native Chipset to Play Original Video Game Cartridges filed on Jul. 25, 2013 which claims the benefit of U.S. Provisional Patent Application Ser. No. 61/808,851 titled Methods, Apparatus and Systems for Use of a Non-Native Chipset to Play Original Video Game Cartridges filed on Apr. 5, 2013.

BACKGROUND OF THE INVENTION

1. Field of the Invention

Apparatus includes a more powerful, but non-native, modern CPU/GPU chipset to play one or more types of original console games.

2. Background Description of the Related Art

So called Retro Gaming is a popular pastime. Although technically inferior to games of today, video games from the 80's and 90's are still very popular with either younger players, older players that grew up with these Video Games consoles, or for people that prefer a more simple "pick up and play" approach to gaming.

A comparison can be made with movies, In a similar way to classic movies such as King Kong, Citizen Kane, Metropolis etc. there are also Classic Video games, such as Super Mario World (1991), Street Fighter II SNES (1992), Sonic the Hedgehog (1991) etc. which were available for Consoles such as the Super NES and Sega Megadrive of that era.

Due to so called Moore's law, Microchips, and Microprocessors in particular become more powerful as time goes by. A processor available today will be thousands of times more powerful than one released in the 1990's. This is also shown in the power of more recent Video Games consoles. In turn this means that a modern processor is often capable of emulating older processors.

Conventional Solutions

People can play newer games on a variety of platforms, current consoles at the time of this filing; popular consoles are PS3, XBOX360 and Nintendo Wii. This also includes Nintendo DS, Sony PSP etc.

These consoles are more than capable of "emulating" the older games, and are often made available for play on these units, either under license, or direct.

It is possible to play these 'classic' or 'Retro' games on other platforms, such as PC (Linux, Mac and Windows), Android Mobile Phones, i-phones etc. however only the program to Emulate the game is available freely. The so called 'ROM images' will almost certainly be under copyright in any territory that has sufficient copyright laws such as the USA. This means that although a user can easily download the program to play the games. The games themselves cannot be legally obtained.

For example, a search through the Android Market (now called Play) which provides applications for the Android (Linux based) mobile phone platform there are more than a dozen emulators for the Super Nintendo (SNES) and NES platforms. However no ROM's are available for download. Furthermore, perhaps due to the more strict vetting procedure, there appear to be no SNES or NES emulators available on the Apple apps store, making it immensely difficult for i-phone and i-pad owners to play "classic" or "Retro" games Users can use the original consoles to play the Console games, however over 20 years it is highly likely that these may have broken. Power supplies may have got lost or thrown away, TV connectivity changes over time etc.

Furthermore, the games often outlast the consoles themselves due to the fact that there are more games than consoles due to the fact that each console owner typically owned more than one game, also ROM cartridges tend to be somewhat more robust. There is an active market in selling second hand Retro Video games consequently, there is therefore a market for replacement consoles, to play original Cartridges, Currently these typically consist of chipsets which are either, verbatim copies of the original chipset, and therefore probably illegal or functionally the same as the original chip-set, and therefore will inherit many of the problems of the original chipset.

Sometimes the manufacturers of these 'clone" machines will provide compatibility with more than one machine so as to offer the end customer the ability to play not just one type of Video Game cartridge but two or more. This extra functionality is added by adding a new chipset for each Console required. That means that if the console is to play three different types of Game Cartridge, then 3 different sets of chips are required. For The device to play four different types of cartridge it would need 4 different chipsets and so on

| Prior Patents | Description |
| --- | --- |
| U.S. Pat. No. RE 28,507 | An early Video game patent. |
| U.S. Pat. No. 5,112,051 | Describes an interfacing device for a computer games system. |
| U.S. Pat. No. 7,988,559 | It is for a computerized gaming system, method and apparatus. |
| U.S. Pat. No. D656,554 | Describes a portable video game console. |
| U.S. Pat. No. 5,207,426 | A controller for a game machine. |
| U.S. Pat. No. 4,359,222 | A portable gaming system. |
| U.S. Pat. No. 4,687,200 | A Multi Directional switch, used on joypads |
| U.S. Pat. No. 4,095,791 | A cartridge programmable video game apparatus. |
| U.S. Pat. No. 4,149,027 | A TV game cartridge and method. |
| U.S. Pat. No. 4,386,773 | A TV game cartridge with expandable memory. |

Problems with the Current Solutions

The following items are problems inherent with using the current solutions

1. Different VLSI technologies can require different voltages; this can cause compatibility problems between different parts of the circuitry.

2. Power consumption with older VLSI is higher than with modern, smaller transistor technology. This means that if the product is using battery power, then battery life will be very short.

3. The support chips to the original chipset such as RAM can be extremely difficult to obtain. Modern RAM chips have thousands of times more storage capacity, and critically not compatible with the ones of the original consoles. This can make obtaining the older RAM chips very difficult and often recycled or "pulled" chips must be used. These pulls of course are far more prone to faults than original chips.

4. Every supported "classic" or "retro" console requires a full chipset. If three consoles are supported, then three separate chipsets are required. This can add further compatibility problems, as well as the extra expense of each additional chipset.

5. Only the Original joypads of the system can be used.

6. Display output is limited to older standards. Modern digital video standards such as HDMI is not supported without adding considerable complexity and even then quality will be defined by the lowest common denominator which of course will be the original console's graphics output.

7. The console manufacturers attempted to prevent gray importing of games so a console from one region often would not play games from a different region.

Software Emulation of Hardware

Software can be used to emulate many things, be it Market economies, traffic etc. it can also be used to emulate electronic circuits or hardware. A computer program can be written to emulate real hardware, or computer chips. If the processor is fast enough, then something approaching full speed emulation can be achieved.

The invention incorporates a modern Processor, and therefore corresponding modern components.

What makes the invention unique is that it contains connectors that can be used to access original games. All solutions thus far either use a copied software image of the game which might be illegal, or use (original) unique hardware chipsets which also may be illegal. This invention combines both a hardware and software solution.

An embodiment of the invention uses emulation to create a layer of abstraction from the original Console game. Instead of data being used directly as it is stored on the game cartridge, it is instead to some extent interpreted or translated. Although this will almost always take more instructions than on the original Console, this is offset however by the SoC's greater processing power.

As an example the following native 65816 is a commonly executed instruction on the Nintendo SNES to read which direction and buttons the player is pressing on the Joypad LDA $4218 in Hex this is $AD,$18,$42

On the original processor this opcode is pointed to by the current PC or program counter, $AD, would be loaded into the Instruction decoder of the processor and the Accumulator or A register loaded with what is contained in location $4218. This on the SNES is the location containing the Joypad values for Player 1. In an emulated system the source code in C might look something like the following.

switch (*pc)

```
{
    case 0xAD:
        Accumulator=read_from_memory(unsigned short)(*(pc+1)+*(pc+2)<<8);
        pc+=3;
        opcode_execution_time=4;
        break;
    case etc.
}
``` this line of C would then be compiled into the SoC's native Opcodes by a C compiler

SUMMARY OF THE INVENTION

The invention is to use a modern fast chipset (including CPU) to emulate older Video Games Consoles in order that original games software, stored on their original media format, can be played.

Advantages of the invention include:

1. Modern VLSI or transistor technology uses less power and lower voltage than the current solution, this makes batteries last longer when used for mobile gaming also the smaller the transistor, the faster usually they perform.

2. A game can be read from the cartridge into RAM, then the cartridge storage device powered down, conserving even more power.

3. There is less likely to be a supply limitation due to the fact that production has not been halted and of course not being recycled or old means they are more reliable. A good example is modern DDR3 RAM compared to older types of SRAM 4. In the invention Graphics are emulated instead of using the original GPU. Higher resolution modes than were possible on the original console can be achieved. Upscaling and anti aliasing are possible.

5. Sound also can be improved over the original using better interpolation and sampling techniques.

6. Incompatibilities between cartridges and consoles can be reduced or removed entirely by utilizing the more modern graphics capabilities of a modern GPU, for example PAL and NTSC compatibility problems can be reduced.

7. Only one chipset is needed, therefore to support extra consoles only requires an appropriate connector and a different emulator to be loaded. This results in cost savings.

8. As the processor, graphics and sound are more modern, modern games that require more memory and more processor speed can be played alongside the 'Retro' games.

9. Modern processors are capable of playing High definition Video content, even high definition content. This was simply not possible on the older generation machines. This means the invention can be used as a Media player as well as its gaming function.

10. Due to the fact that the contents of a ROM is loaded into RAM, cheat devices can be implemented in software at no extra build cost, adding value to the product.

11. By copying the contents of RAM to MSD, the game can be "Frozen" at any point of play. If this is then reloaded a game can be continued to be played from the exact moment that it was saved. A feature that was rarely available on the original consoles.

12. Some games contained extra chips to give the consoles some kind of an advantage, this might have been Extra RAM, custom 3D chips etc. When using pure emulation and not the original games cartridges, these chips are not available and so require more programming and processing power. The invention offers the possibility to use these chips for the purpose which they were originally intended which might lighten the load of the CPU making more realistic emulation possible.

13. Modern SoC's typically have better sound capabilities than the older consoles. This means that when generating the audio and music output, sound can be created in better quality than the original.

DETAILED DESCRIPTION OF EMBODIMENTS

Reference is made to the Figures in which elements of the illustrated embodiments of the invention are given numerical designations so as to enable one skilled in the art to make and use the invention. It is understood that the following descriptions are exemplary of embodiments of the invention.

1. First Example Embodiment of the Invention

Figure 1:
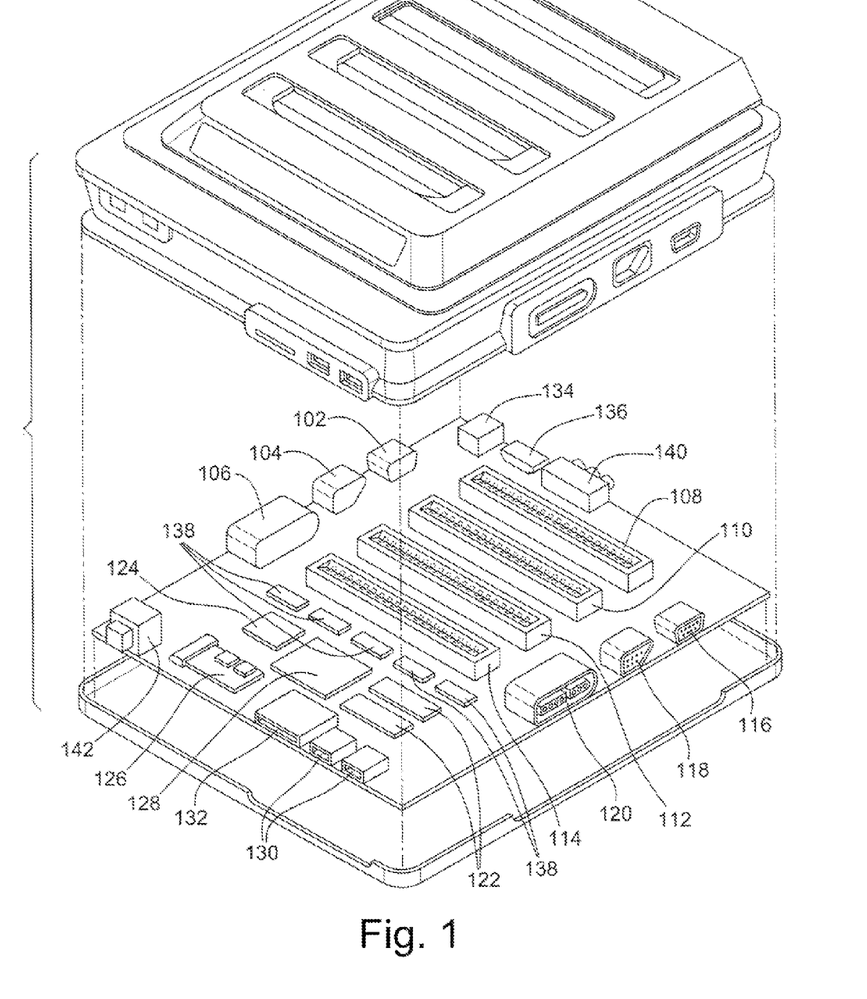
FIG. 1 is an illustration of how the first example embodiment might appear, herein referred to as "First Example Embodiment"
Figure 3:
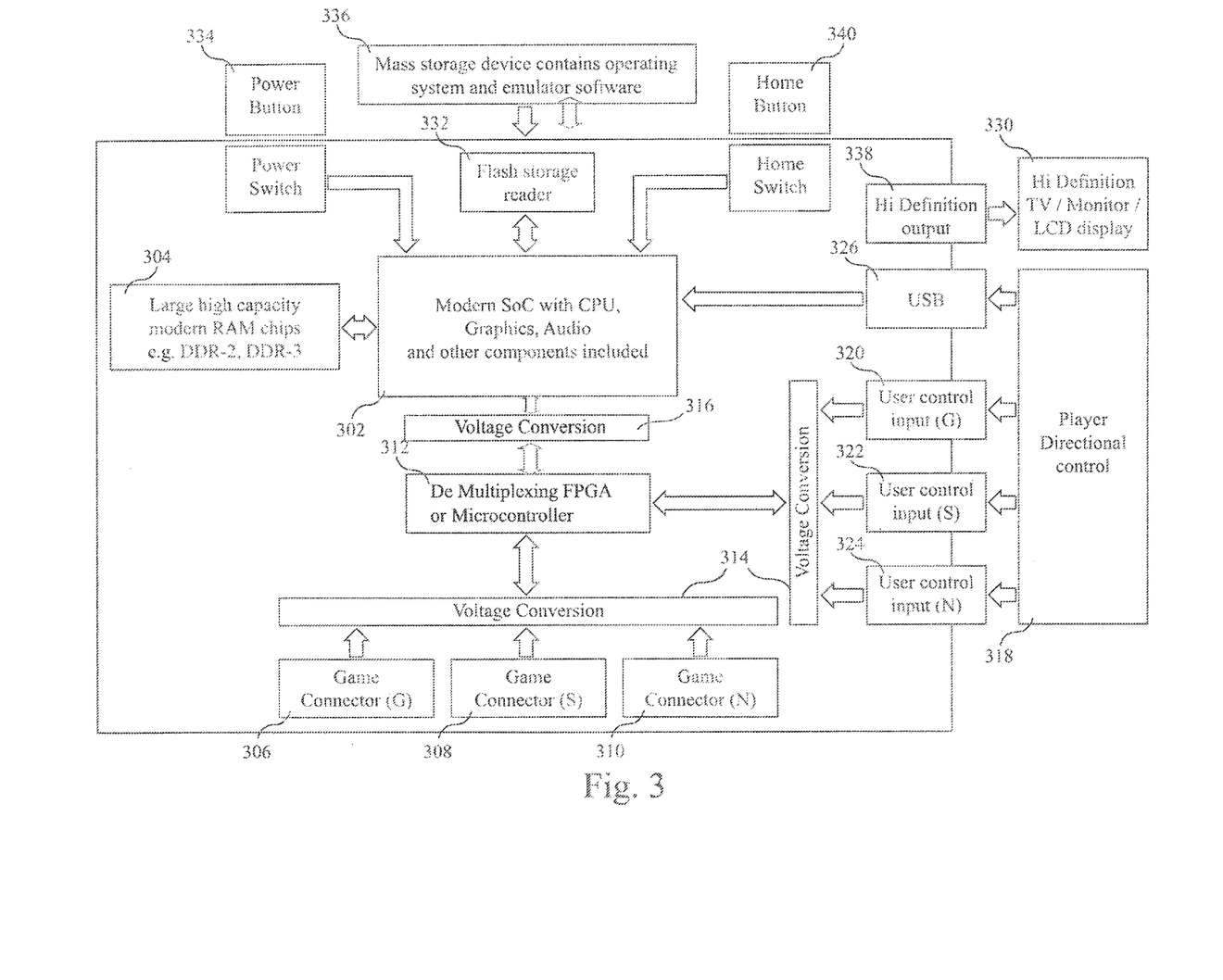
FIG. 3 is a functional diagram that illustrates a functional block diagram of the first example embodiment.

First Example Embodiment of the Invention with Reference to FIG. 1 and FIG. 3:

1. A CPU/GPU/Sound and other I/O combination item 302/128 such as a SoC is one feature of an embodiment. At the time of writing, suitable parts might be Texas instruments AM3359, Allwinner A10, Nvidia Tegra 3, Rockchip RK3066 etc.

2. This is connected electrically to RAM 304/122, possibly DDRAM-3, such as those provided by Samsung, Kingston and many other manufacturers.

3. A Boot program is loaded to RAM containing a GUI from a MSD 306/132, such as SD card, readily available from many manufacturers such as Sandisk.

4. Cartridge ports such as 306, 308, 310, 110 are scanned for the presence of one or more game cartridges.

5. A RAM based FPGA could be configured to access each cartridge port to scan for cartridges present. Using a programmable RAM based FPGA in this way may help save on cost as the same chip can be configured for each different game slot. This is indicated in the Figures as item 312 and 124. An example FPGA might be a Xilinx XC3S50ATQ144. Alternatively a Microcontroller such as the Nuvoton NUC220 chip could be used.

6. Older chip technologies tend to user higher voltages than more modern ones, so in this Example Embodiment Voltage level shifters 314, 316 and 138 are used to adjust the Voltages between the differing technologies. Alternatively a Microcontroller or FPGA with multiple I/O voltage capacity could be used, such as those manufactured by Nuvoton.

7. Users will be able to select various options by using one of the Human interface devices in 318. These could be either original console input devices such as Joypads as shown in 102,104,106 and 116,118,120, or a more modern input device such as Mouse, Keyboard or Bluetooth Joypad.

8. Visual Feedback is provided to the User by the GUI menu as indicated by block 338/136, 330. Options that might be entered via this menu include;
   a. Overclocking, where games can be made to run faster (or slower) than originally intended
   b. Anti Aliasing, Lines which appear jagged can be smoothed out.
   c. Upscaling, allows games to be displayed in a higher resolution than originally intended
   d. Insertion of Cheat codes.

9. A cartridge, present in 306,308, or 310/112 is likely to be loaded into available RAM 304/122, this allows for,
   a. Much faster access speeds than in the original games.
   b. Lower power consumption, the original cartridges required higher voltages and current. This means less power is drawn; embodiments can be run on Batteries, such as Example Embodiment 2

10. The FPGA/MCU, 312/128 used to read from the cartridge port, could be released after this task is completed and then used to give additional processing power.

11. An appropriate software emulator is loaded from MSD 306/132 into RAM 304/122.

12. The software emulator program is run via the SoC's main processor 302/128, and the game is run, albeit in an emulated as opposed to native form meaning that Processor and/or Graphics instructions are therefore likely interpreted and not directly executed as on the original console.

Game direction is input via controllers 318 plugged into compatible connectors 320,322,324,326 In FIG. 1, these are 102,104,106 for Player 1 and 116,118 and 120 for Player 2 as well as 130.

13. If a user wishes they can decide to select the "save" option, this is initiated by a button or button press sequence. Storing the contents of RAM to MSD. This can then later be loaded back into memory so that the game is resumed from the exact point at which the user had originally saved the game.

14. As an extra feature, one or more of the various cheat systems can be implemented in software, allowing extra value at no extra build cost

2. Second Example Embodiment of Invention

Figure 2:
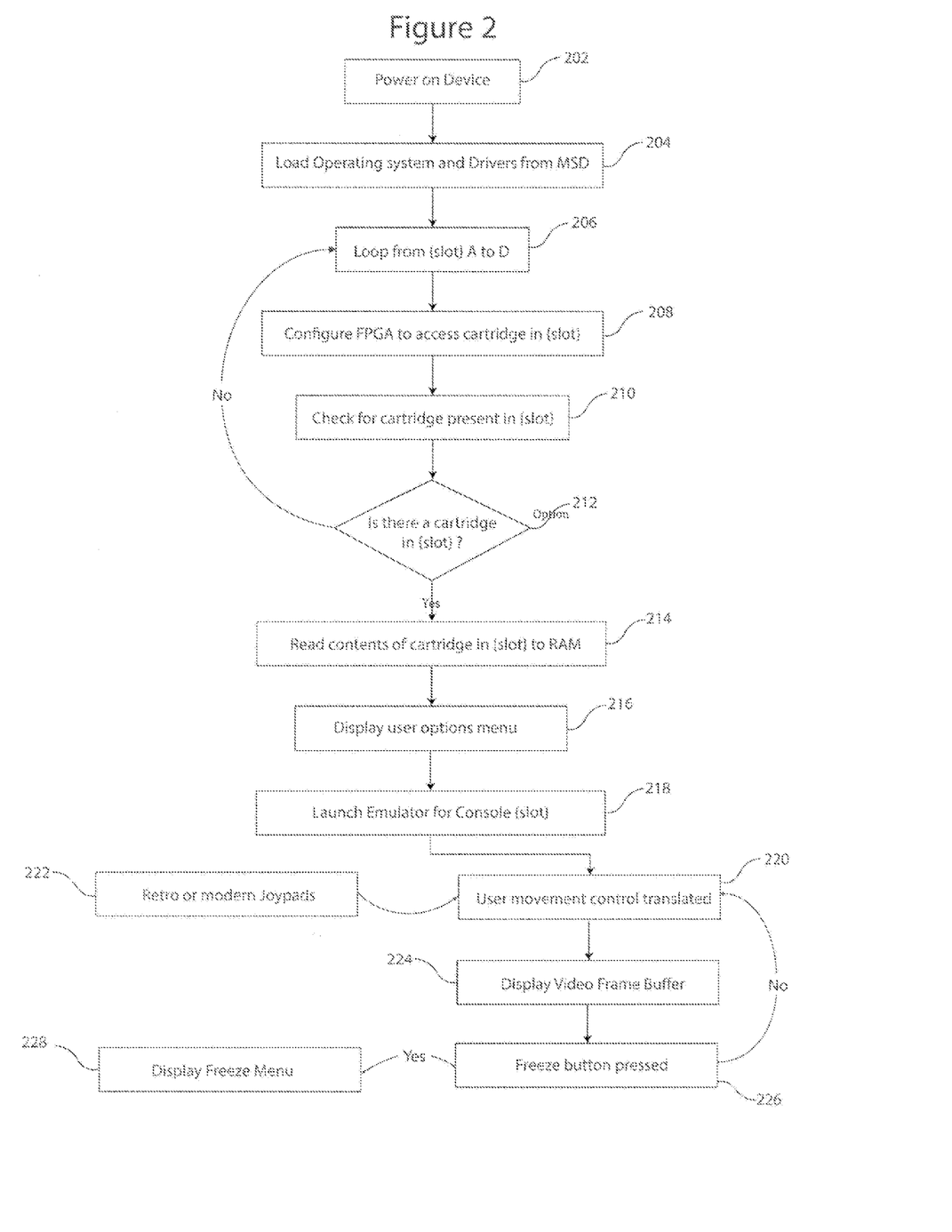
FIG. 2 is an exemplary flow chart of the First example embodiment of the invention.

With Reference to FIG. 2 and FIG. 1

1. At step 202 as shown in FIG. 2, in this embodiment the Power on Function is provided by an ordinary toggle switch 142. Once power is provided to the circuitry the SoC's main CPU will start its boot process.

2. The SoC's main processor, for example a Rockchip RK3066, as part of its normal procedure will load and boot data from MSD, in this embodiment a common SD Flash such as that provided by Sandisk, Toshiba, or other manufacturers known to skilled persons is used as storage space to hold the Operating System as represented in 204.

3. In step 206 it is assumed there are 'D' number of game cartridge slots. In this particular embodiment there are 4 slots in the device however this could be any number starting from one.

4. To be able to read from each slot in turn a RAM based programmable logic device (FPGA) such as the Xilinx Spartan XC3S50 is used in step 208 is used to check each slot for a valid game cartridge. The FPGA is used to effectively increase I/O from the SoC. If the SoC has sufficient I/O available, the FPGA could be dispensed with to save on cost in alternative embodiments. An alternative to an FPGA is a Microcontroller such as the Nuvoton NUC220.

5. A game cartridge is easily digitally distinguishable from no cartridge. In step 210 the FPGA/MCU, likely in conjunction with the SOC's CPU, is used to check for the presence of a game cartridge.

6. A program loop, 212, is created to check all slots for the presence of cartridges.

7. Once at least one cartridge is found, then in 214 the ROM contents of the cartridge are read into RAM. If there is more than one cartridge inserted then one can be selected by the user. From here the content can be accessed faster than the relatively slower ROM used in typical (especially older) game consoles.

8. In step 216 a custom GUI is loaded from storage media into RAM and output displayed on the output display device, typically a TV or monitor perhaps using an HDMI output such as 136 shown in FIG. 1 and controlled using one of the Joypad input methods. The interface is designed to assist the user to make various choices about the game before launching. For example whether to activate any cheats, any graphical filters to improve game appearance whether to speed up (overclock) or slow down a game etc.

9. In step 218 A 'Software emulator' to translate the original code and data into appropriate code and data for the new chipset is also loaded into RAM to a separate memory location.

10. In step 220 the Emulator is launched by passing its start address to the program counter, any configuration options entered by the user into the GUI are passed to this section of code.

11. The external Joypads in step 222, are read continuously during play and the values passed to the emulator. Output from the emulator is displayed on the Screen in step 224. Should the user press an assigned button(s) on the console or joypad button the user is taken back to the GUI in steps 226 and 228 where they are given the option to Save the RAM contents to Mass Storage device, probably SD card so the game can be loaded at a later date after the machine has been switched off.

3. Second Example Embodiment

Figure 4:
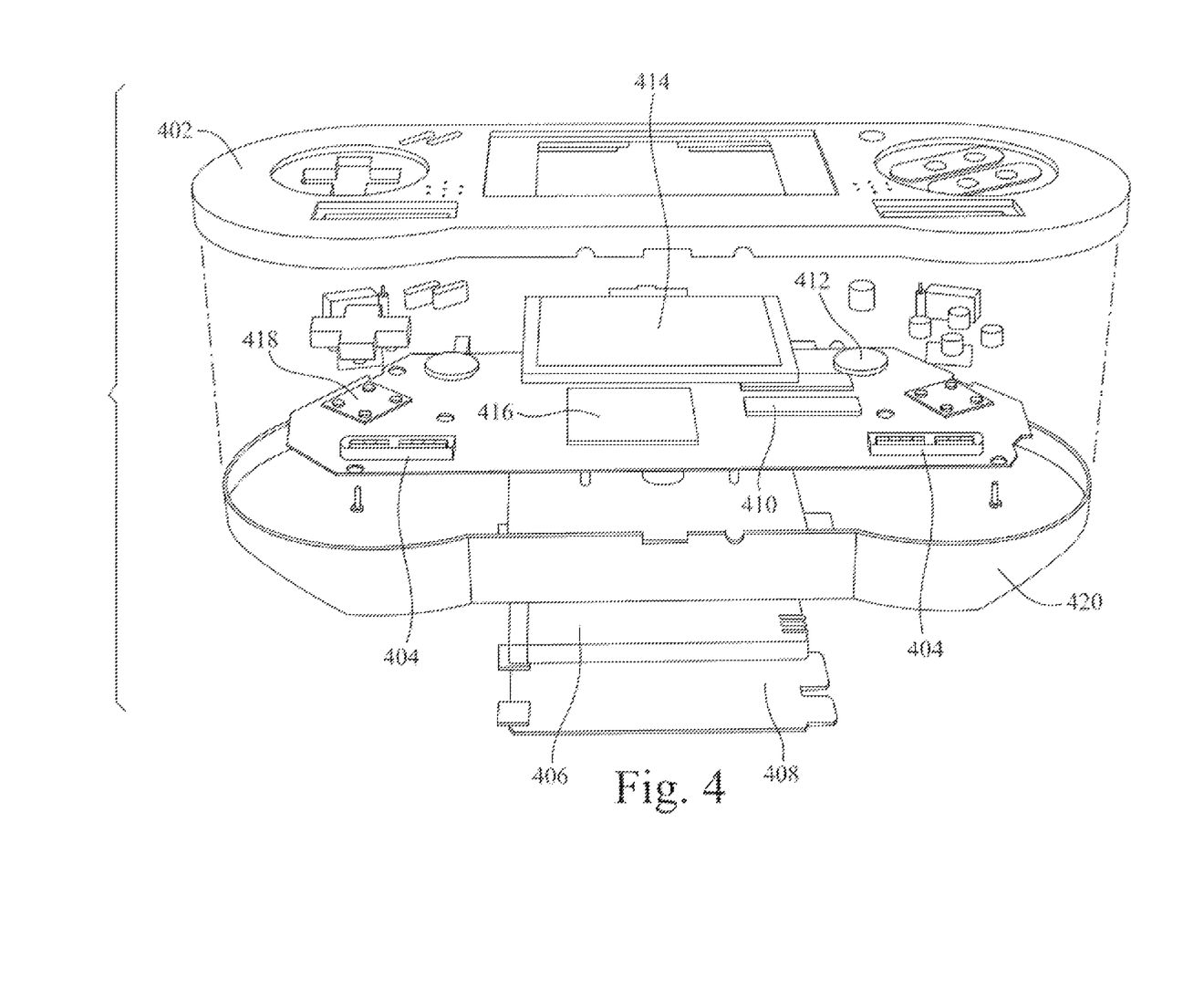
FIG. 4 is an exploded view of a Second example embodiment of the invention.
Figure 5:
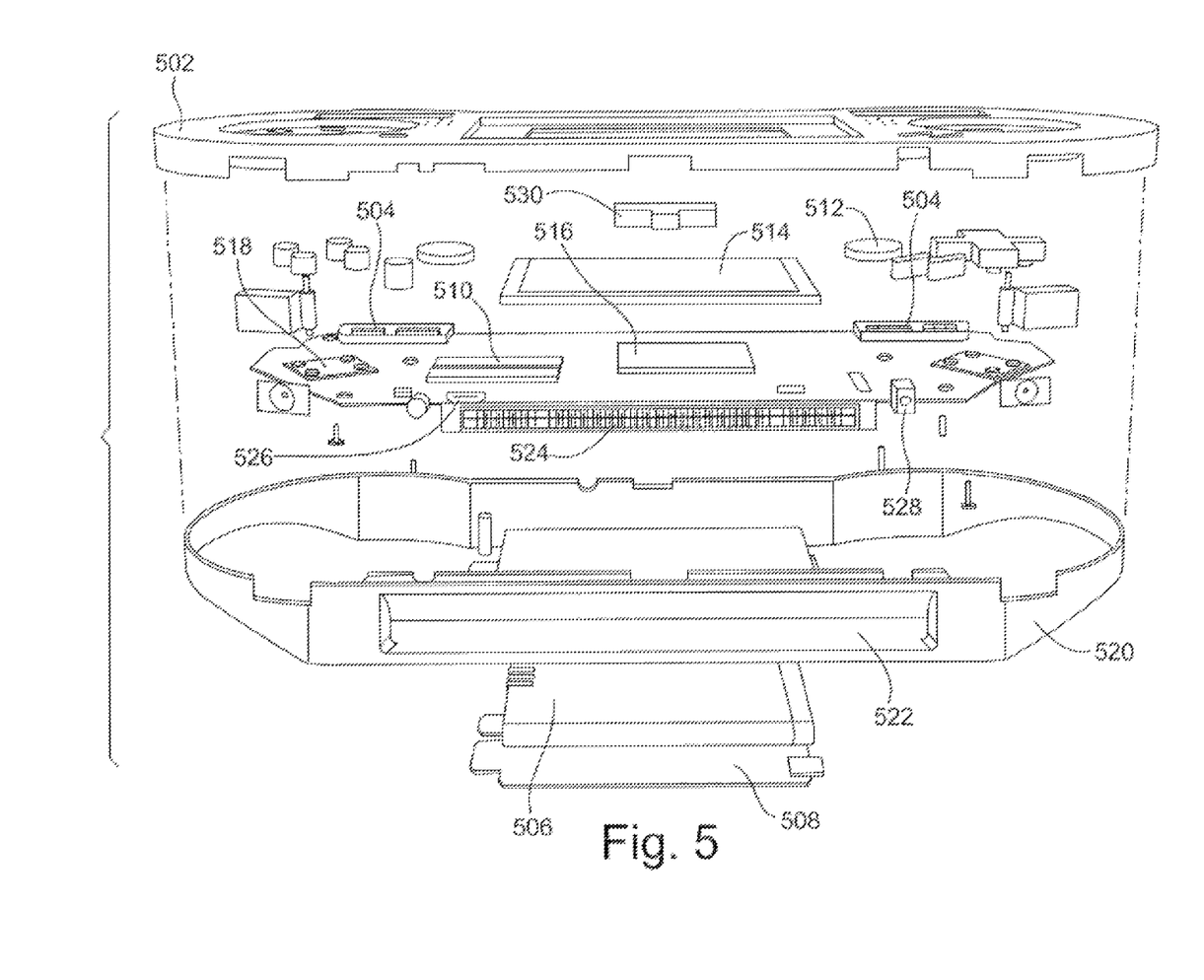
FIG. 5 is another exploded view of the Second example embodiment of the invention.

Referring to FIG. 4 and FIG. 5, this example embodiment, the invention is used for a mobile or hand-held device. FIG. 4 is a front view of the second example embodiment. FIG. 5 is a rear view of the same example embodiment.

4. Second Embodiment Implementation

In this second example, the system is designed to be a portable system. In addition to similar components used in the first example embodiment, there is also the addition of a battery 406,506 and a display such as LCD 414,514. The sockets 404,504 allow the insertion of compatible joypads of the original machine. The button layout 418,518 can be arranged in a comparable formation of the Console that is under emulation.

5. FIGS. 4 and 5 Key

| | |
|---|---|
| 402, 502 | Plastic top case part |
| 404, 504 | Sockets to allow original console controllers to be used |
| 406, 506 | Rechargeable battery |
| 408, 508 | Battery cover |
| 410, 510 | RAM to store Emulation code, binary image of cartridge graphical front end, and temporary console game. |
| 412, 512 | Speakers for sound output |
| 414, 514 | LCD Display for viewing gameplay output when on the move |
| 416, 516 | None Native SoC containing Microprocessor(s) Graphics processor(s), sound etc. |
| 418, 518 | Buttons sensors arranged to emulate the positioning of the Retro console. |
| 420, 520 | Lower part of case |
| 522 | Flap for retro Cartridge insertion |
| 524 | Cartridge Receptor for retro cartridge reading |
| 526 | HDMI Micro connector for modern TV connectivity |
| 528 | Power Socket for recharging and/or direct power |
| 530 | On off slide switch |

Advantages of the second example embodiment include,

1. There is likely to be a significant advantage in battery life. As previously mentioned, the older technology chips tended to use more power, and therefore battery life would be typically much shorter than using the invention.

2. As in the first embodiment, features can be included such as cheat codes where locations on the original game can be modified to provide cheats such as unlimited lives, level skip etc.

3. More modern connectors can be provided such as HDMI to provide compatibility with more modern Television systems so games can be played on TV using the unit. This can be of particular benefit when the original consoles could not be easily connected to TV sets.

GLOSSARY

GUI

Graphical User Interface, a method by which a user is allowed to view and Enter and read data, typically in a nicely displayed, Human Readable form,
http://en.wikipedia.org/wiki/Graphical_user_interface

Software Emulator

Is a computer program run on a CPU that typically emulates other CPU's or hardware chips. Often written in a high level language such as C, then compiled into a binary executable.
http://en.wikipedia.org/wiki/Emulator

Cheat System

A method where data is modified from its original intended value to perform a function other than that intended. Often used to create items such as infinite lives, invulnerability.

Cheat Code

Data representative either directly or indirectly of a modification that produces a change in intended function, a classic example is "An Infinite lives cheat code",
http://en.wikipedia.org/wiki/Cheating_in_video_games

HDMI

A digital video transfer protocol designed for transferring multiple resolutions and definitions. Typically from storage devices such as a Blue Ray Player and display devices such as a TV,
http://en.wikipedia.org/wiki/HDMI

ROM Images

A digital image or binary file taken from a ROM and stored on a computer, in the context of this document it refers to the binary content of a game cartridge that has been transferred somehow to a file.
http://en.wikipedia.org/wiki/ROM_image

Moore's Law

The observation (and prediction) that transistors on Integrated circuits are approximately doubled every 2 years.
http://en.wikipedia.org/wiki/Moore's_law

Classic/Retro Games

Games from previous generations
http://en.wikipedia.org/wiki/Retrogaming

Joypad

A type of Human interface device held in the hand where digits are used to provide input.
http://en.wiktionary.org/wiki/joypad

Gray Importing

Refer to "legal goods" which are sold outside normal distribution channels by companies which may have no relationship with the producer of the goods.

VLSI

Very-large-scale integration (VLSI) is the process of creating integrated circuits by combining thousands of transistors into a single chip.
http://en.wikipedia.org/wiki/Very-large-scale_integration

GPU

Graphics Processor unit, is a specialized processor designed to display and manipulate graphics data.
http://en.wikipedia.org/wiki/Graphics_processing_unit

SoC

Solution On a Chip, is a chip that integrates many components of a computer into a single chip.
http://en.wikipedia.org/wiki/System_on_a_chip

Chipset

A Chipset is a group of Integrated Circuits that are used together perform a specific task. A GPU and CPU will often be included in a chipset, and the group of chips used in one Video game console might be referred to as a chipset. A SoC typically will contain a chipset

SNES

Abbreviation for Super Nintendo Entertainment System, a popular Video Games system first released by Nintendo in Japan in 1990, then in North America in 1991 then Europe and Australasia in 1992
http://en.wikipedia.org/wiki/Super_Nintendo_Entertainment_System

MSD

Mass storage device, A device for storing large amounts of data when there is no power
http://en.wikipedia.org/wiki/Mass_storage_device

What is claimed is:

1. An apparatus for use of a non-native chipset to play original video game cartridges comprising a central processing unit, a graphics processor unit and audio controller operatively connected to one or more cartridge ports through voltage level shifters;
    said cartridge ports adapted to connect to one or more video game cartridges to enable access to video game content on said video game cartridges and to display the video game content on an associated output device and further including
    the central processing unit, graphics processing unit and audio controller are electrically connected to RAM,
    a boot program is loaded to the RAM containing a graphical user interface (GUI) from a mass storage device (MSD);
    a field programmable gate array (FPGA) or microcontroller unit (MCU) configured to access each of the cartridge ports to scan for the presence of the video game cartridges having differing voltage level requirements, and the voltage level shifters are adapted to adjust the voltages between the differing voltage requirements of the video game cartridges detected in the cartridge ports, the video game information from the detected video game cartridge is loaded into the RAM;
    the GUI has a display menu to list options for the user to select one or more options selected from the group consisting of
    overclocking, where games can be made to run faster or slower than originally intended,
    anti aliasing, so lines which appear jagged can be smoothed out,
    upscaling, to allow games to be displayed in a higher resolution than originally intended, and
    insertion of cheat codes;
    a software emulator is loaded from a mass storage device (MSD) into the RAM, so that the software emulator program and the video game is run in an emulated as opposed to native form meaning that processor and/or graphics instructions are therefore interpreted and not directly executed as on the original video game cartridge; and
    game direction is controlled by the user using controllers so that the user can select to store the contents of the RAM to the MSD so that the contents of the RAM can subsequently be loaded back into memory so that the video game is resumed from substantially the point of play at which the user had originally saved the video game.

2. The apparatus of claim 1 further comprising a human interface device operatively connected to the central processing unit.

3. The apparatus of claim 1 further including a mass storage device operatively connected to one or more of the cartridge ports.

4. An apparatus for use of a non-native chipset to play original video game cartridges comprising a central processing unit, a graphics processor unit and audio controller operatively connected to one or more cartridge ports, the central processing unit, graphics processor unit and audio controller comprise a system on a chip (SoC), wherein
    activating a toggle switch provides electrical power to start a boot process for the central processing unit of the SoC and the central processing unit of the SoC loads and boots an operating system and drivers from a mass storage device (MSD);
    a programmable logic device or microcontroller unit (MCU) configured to access the cartridge ports and to detect the presence of one or more video game cartridges in the cartridge ports and voltage level shifters are adapted to adjust the voltages between the differing voltage requirements of the video game cartridges detected in the cartridge ports,
    so that once at least one video game cartridge is detected, the read only memory (ROM) contents of the cartridge are read into the RAM, and if there is more than one video game cartridge detected, then one video game cartridge is selected by a user;
    a graphical user interface (GUI) is loaded from a storage media into the RAM and an output is displayed on an output display device to display a user options menu to assist the user to select various configuration options about the video game from the user options menu before launching the video game;
    a software emulator is loaded into the RAM to a separate memory location, the software emulator configured to translate the original code and data from the ROM contents of the selected video game cartridge into appropriate code and data for the SoC, so that the software emulator is launched by passing its start address to a program counter and the selected configuration options entered by the user into the GUI are utilized; and human interface devices are read substantially continuously during play and the output from the human interface devices are passed to the software emulator, and wherein output from the software emulator is displayed on the output display device so that the user is given the option to save the RAM contents to a second mass storage device so the video game can be subsequently loaded into the RAM after the apparatus has been switched off.

5. The apparatus of claim 4 further comprising the graphical user interface allows a user to enter a game play option selected from the group consisting of overclocking, anti-aliasing, upscaling and insertion of cheat codes.

6. The apparatus of claim 4 wherein the system on a chip includes a cheat system to manipulate the video game content on the video game cartridges.

7. The apparatus of claim 4 wherein the associated output device is a battery operated display device.

8. The apparatus of claim 7 further comprising one or more joypads operatively connected to the system on a chip to manipulate the video game content shown on the output device.

9. A method for using a non-native chipset to play original video game cartridges using a system on a chip (SOC) operatively connected to one or more game cartridge ports, comprising the steps of:

initiating a toggle switch to provide electrical power to start a boot process for the central processing unit of the SoC so that the central processing unit of the SoC loads and boots an operating system and drivers from a mass storage device (MSD);

initiating a programmable logic device or microcontroller unit (MCU) which is configured to access the one or more cartridge ports and to detect the presence of one or more video game cartridges in the one or more cartridge ports, and voltage level shifters adjust the voltages between the differing voltage requirements of the video game cartridges detected in the cartridge ports, so that once at least one video game cartridge is detected, then the read only memory (ROM) contents of the cartridge are read into the RAM, and if there is more than one video game cartridge detected, then one video game cartridge is selected by a user;

loading a graphical user interface (GUI) from a storage media into the RAM so that an output is displayed on an output display device to display a user options menu in order to assist the user to make various choices about the video game before launching the video game;

loading a software emulator into the RAM to a separate memory location, the software emulator configured to translate the original code and data from the ROM contents of the selected video game cartridge into appropriate code and data for the SoC, so that the software emulator is launched by passing its start address to the program counter and configuration options entered by the user into the GUI are utilized; and reading output from a human interface device during video game play and the output is passed to the software emulator, and wherein output from the software emulator is displayed on the output display device so that the user is given the option to save the RAM contents to a second mass storage device so the video game can be subsequently loaded into the RAM after being powered down and then restarted.

10. The method of claim 9 comprising the step of saving contents of the RAM to an additional mass storage device.

11. The method of claim 9 comprising the step of including cheat codes operatively connected to the programmable logic device or microcontroller unit (MCU) to allow manipulation of the video game content shown on the output display device.

12. The method of claim 9 wherein the human interface device is selected from the group consisting of external joypads, mouse, keyboard and bluetooth joypad to manipulate the video game content shown on the output display device.

* * * * *